United States Patent Office 3,479,862
Patented Nov. 25, 1969

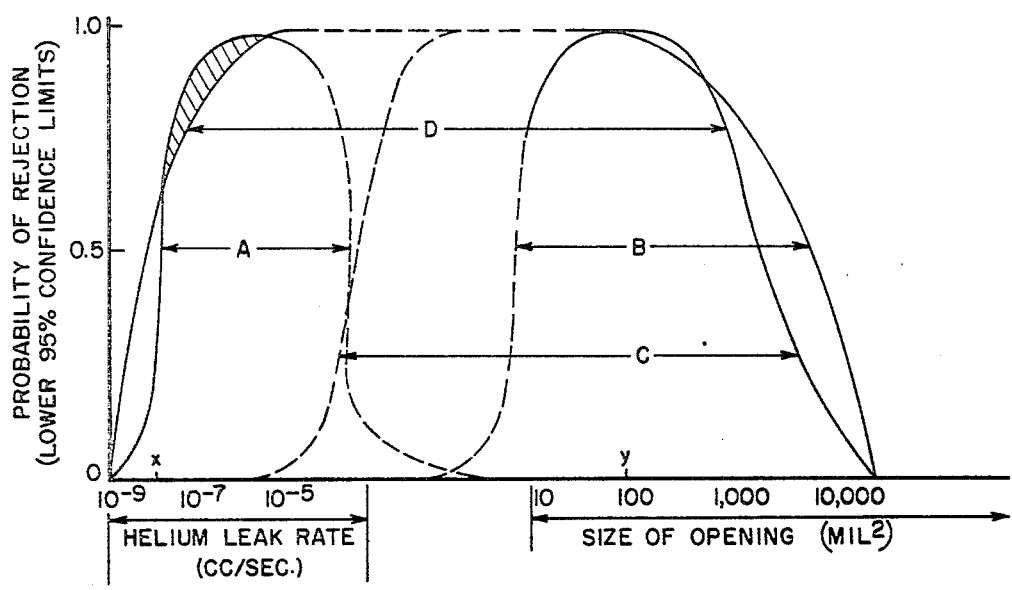

3,479,862
HERMETICITY TEST FOR PACKAGED
ELECTRICAL COMPONENTS
Orlin D. Trapp and Don L. Cannon, Baltimore, Md., assignors to Westinghouse Electric Corporation, Pittsburgh, Pa., a corporation of Pennsylvania
Filed Mar. 24, 1967, Ser. No. 625,640
Int. Cl. G01m 3/34
U.S. Cl. 73—49.3          6 Claims

ABSTRACT OF THE DISCLOSURE

A method including placing packaged components in a pressurized liquid and measuring electrical resistance between conductors as an indication of the extent to which liquid has penetrated the package.

BACKGROUND OF THE INVENTION

Field of the invention

Electrical components require packaging having some degree of hermeticity for high reliability. Solid state components such as transistors and integrated circuits are susceptible to deterioration in characteristics from any liquid or vaporous environmental contaminants. These contaminants may for example cause failures by corrosion of metallic elements such as interconnections on integrated circuits and affect the performance of P-N junctions through creating leakage currents and general instability of performance.

The sites at which leakage occurs into packaged components of course vary considerably in size. At the higher end of the scale are those that are readily detected by visual examination and thus present no great problem. At the other end of the scale are those openings of such small size that despite their presence operation of the component can be expected within satisfactory limits for suitable lifetime. The subject matter with which this application is principally concerned is hermeticity testing that provides reliable indication of excessive leakage through openings not reasonably detected visually.

Description of the prior art

In the present testing of the hermeticity of packaged semiconductor devices, such as integrated circuits, a variety of types of tests are employed each having certain disadvantages associated with them.

One type of test is a gas leakage test wherein the packaged unit is pressurized in a test gas atmosphere, such as helium or radioactive krypton, and then checked after removal from the test gas atmosphere for outward leakage of the particular gas such as by utilizing a mass spectrometer or some other appropriate sensor. This test does not detect larger leaks because sufficient test gas is not retained within the package long enough for detection by the sensor. Also, this test cannot be performed in the presence of ancillary apparatus such as device carriers or printed circuit boards on which the component may be confined due to the absorption and subsequent re-emission of the gas from the carrier and circuit board materials. Additionally, test equipment for such a test is relatively expensive and the time required for the test is relatively lengthy.

Another type of test is a bubble test wherein the unit is immersed in a hot liquid. The emission of visible bubbles from the package defines a nonhermetic enclosure. The package may first be sensitized by filling it with a harmless, low vapor point liquid. It is found that this test is highly dependent upon the individual operator and again cannot be performed in the presence of carriers or circuit boards.

A third type of test employed is that wherein an electrically conductive liquid is introduced into the package as by immersing a heated component into the liquid. This test may be referred to as the thermal shock test. The presence of the liquid within the package is detected by excessive lid-to-pin electrical conduction performed by measuring the resistance between conductive elements extending from the package. This test is relatively convenient to employ but is found insufficient to accurately reveal packages with smaller but still harmful leakage rates.

Because of the various deficiencies in the individual tests previously known it is generally necessary that a combination of tests be employed to insure high reliability products. Typically, the helium leak test is used in combination with a bubble test. Even the use of both of these relatively expensive tests fails to screen out all undesirable products because there is very little overlap in the ranges covered by the two types of tests leaving a medium leakage rate range likely to go undetected. The electrical leakage-thermal shock test assists in reducing the expense of the operation because it can substantially replace the bubble test. However, it does not detect smaller leakage rates and so it is still required that it be used in combination with another test such as the helium test but in that case, also, medium leakage rates are not readily detected.

Therefore it is desirable to find a single test that is, among other advantages, fast and economical to perform and not dependent upon operator judgment and one that will cover a wide range of leak rates and permit testing while the packaged component is associated with other apparatus such as carriers and printed circuit boards.

SUMMARY OF THE INVENTION

A test overcoming the above-described deficiencies of prior procedures is provided wherein the units are placed in a chamber containing a liquid pressurized substantially above atmospheric pressure for a time to permit the liquid to penetrate within the package through leak sites. After removal from the liquid and drying, the electrical resistance between two conductors on the exterior of the packages is measured to determine the presence of liquid within the package. This single test unexpectedly covers substantially the entire range of harmful leak rates previously covered only by a combination of tests and, furthermore, this test effectively detects medium leakage rates likely to go undetected by any of the prior tests.

BRIEF DESCRIPTION OF THE DRAWING

The single figure is a graph illustrating the effectiveness of the hermeticity test in accordance with this invention compared with prior tests.

DESCRIPTION OF THE PREFERRED EMBODIMENTS

Referring to the drawing, the ranges over which the various tests are effective are illustrated. The limit of the tests is determined experimentally in the case of the lower extreme of the helium test (curve A) and the upper extreme of the bubble test (curve B), as shown by the solid lines. Between the limits indicated there is no effective way of exactly measuring the leak rate or opening size and hence the other limits of the ranges covered by those tests are indicated by dashed lines based on experimental inference.

For the helium leak range curve, several lots of helium leakers with known helium leak rates were exposed to the different hermeticity tests, yielding several different reject percentages for each test for each leak range. Using this data the lower 95% confidence limit of the percentage of rejects for each test for each leak range was completed. This number is plotted as the probability of detection versus helium leak range. A similar experiment was done on gross leakers with measurable package openings resulting in the probability of detection versus package opening area for each test.

The thermal shock test (curve C) is found to detect a number of failures not detected by the bubble test as indicated by the estimated curve for it. However, a large number of failures detected by helium tests are not detected by the thermal shock test. The pressurized liquid test in accordance with this invention (curve D) is found to cover substantially the entire range of both the helium test and the other two tests as well as the intermediate range.

Point $x$ on the abscissa of the drawing is at about $5 \times 10^{-8}$ cc./sec. the test limit of the helium test used. A $10^{-9}$ cc./sec. leaker thus has a low probability of being detected as nonhermetic with such a test. Smaller leakage rates are generally acceptable for high reliability products. The shaded portion between curves A and D indicates the slightly greater probability of detection of certain leakage rates by helium test rather than the test of this invention. Overall, however, it is clear that the present test effectively replaces such prior tests.

Point $y$ is at about 100 mil.$^2$, above which openings are readily detected by visual inspection. Hence, the discrepancy between tests at the higher end is unimportant as a practical matter.

The conditions under which the test in accordance with this invention may be carried out may be considerably varied but the essential requirements and specific examples will be described.

The electrical test to which the packaged unit is subjected following treatment with the pressurized liquid may be varied in accordance with the degree of hermeticity desired in the nonrejected product. Principally, the selection of the value of tolerable resistance determines how far into the range of units that are rejected as helium leakers the test extends. Experiments involving more than 47,000 units of various types of semiconductor integrated circuits have indicated that for all types a 200 megohm criterion was an optimum for a high reliability product. It may be desirable however where high reliability requirements are less stringent that this test be relaxed and, for example, a package exhibiting a resistance as low as 50 megohms might be of sufficient reliability. Of course, the amount of tolerable resistance will also depend on the conductivity of the liquid selected for use in the test, the spacing between the conductors, and possibly other factors.

In testing packaged integrated circuits it is convenient that the test be performed by connecting all of the leads together and measuring the resistance between them and the metallic lid of the package as a reliable indicator of the presence of liquid having penetrated therein, although in general any two conductors extending from the package may be used as the points for test.

The pressure at which the liquid is pressurized is chosen so that the time of pressurization may be minimized although the pressure should preferably not be so high as to require extreme safety precautions. At least twice atmospheric pressure is generally desirable. In the case of semiconductor integrated circuits and most other components the packages are rated to withstand certain pressure. The pressurization during hermeticity testing in accordance with this invention can serve also to determine that the packages do withstand the rated pressure. For example, flat packages for integrated circuits are rated to withstand at least 70 p.s.i.g. 70 p.s.i.g. was chosen for normal use because it is easily attained and requires minimal safety precautions although pressures up to 90 p.s.i.g. have been evaluated.

The conductive liquid with which the test is performed may be variously selected. It is preferred that it have reasonable conductivity, low surface tension, low viscosity, ease of film evaporation, that it be inexpensive and noncorrosive to the component and package, and nonhazardous to use. In general the criteria of conductivity, surface tension and viscosity may be about that or better than that of pure water.

It is preferred that the liquid be selected as at least one member of the group consisting of water, methyl alcohol, ethyl alcohol, isopropyl alcohol, acetone and some liquid fluorohydrocarbons such as hexafluoro acetone sesquihydrate, trifluoro-ethanol, and hexafluoro-isopropanol. Experimental tests have so far indicated that the choice of methyl alcohol is the best one available meeting all of the various requirements mentioned above as well as low cost and freedom from personnel hazards in use.

The time of pressurization may be variously selected in accordance with the required degree of hermeticity. That is, longer pressurization tends to insure greater probability of detecting small leaks. Various tests have been made to determine, at fixed pressure, the variation in results when pressurization has been permitted to occur for various times. Such experiments indicate that a high probability of detection of those units that fail the helium test are achieved after pressurization of at least five minutes. It is preferred that the pressurization be permitted to occur for at least 4 hours in order to minimize any variation in results.

The drawing illustrates the range of results for tests performed at 70 p.s.i.g., for four hours, employing methanol, and a 200 megohm at 40 volts DC electrical test.

The following table summarizes results obtained on a sampling of 501 integrated circuit packages that were subjected to four different types of tests as described in the table. Sixty-three of the units were found to fail at least one of the tests. The significant aspect of the data in the table is that only seven of the sixty-three units were not detected as failures by the electrical isolation test in accordance with this invention. Also this table demonstrates the much greater effectiveness of the test in accordance with this invention compared with the electrical isolation test using thermal shock to provide the liquid in the package because of the 56 units failing the 200 megohm test, 45 were also tested and found to fail the 50 megohm test, while a 50 megohm test performed on thermal shock units only resulted in locating 9 failures.

The helium leak test employed in obtaining this data was to determine leakage rates of at least $5 \times 10^{-8}$ cc./sec., whereas it is generally acceptable in the integrated circuit trade for leakage rates of $5 \times 10^{-7}$ cc./sec. Thus, some of the seven units indicated as rejects would be commercially acceptable. It is to be understood in considering data of this type that the object is not to determine any leak range rate at all but those leak rates that contribute to device failure. As shown a number of units, 18, that are not detected by the helium leak test are detected by the test in accordance with this invention. This of course is merely a representative sampling and the distribution of the number of units failing the different tests can be expected to vary between different samples. However, in all the experimental work performed greater effectiveness of the test in accordance with this invention has been confirmed.

TABLE

A—He bomb, 2 hrs. at 45 p.s.i.g.; $5 \times 10^{-8}$ cc./sec. leakage

B—Bubble test, 125° C. ethylene glycol; bubbles visible to naked eye

C—Electrical isolation, immerse hot components in methyl alcohol; resistance 50 megohms D—Electrical isolation, component in pressurized methyl alcohol; resistance 200 megohms

| Test failed: | Number of units |
|---|---|
| A only | 7 |
| A–B–D only | 1 |
| A–B–C–D only | 1 |
| A–C–D only | 4 |
| A–D only | 32 |
| B–C–D only | 5 |
| B–D only | 2 |
| D only | 11 |
| | 63 |

(of the 56 units failing test D, 45 when electrically tested showed less than 50 megohms resistance).

The invention may be practiced with packaged components when the package defines a void around the component or where it comes in direct contact with the component such as in plastic encapsulated components. With the latter there is no hermeticity leak rate to measure. However, the products still requires a measure of effective protection from any liquid or vaporous environmental contaminants. The method in accordance with this invention is suitable for that purpose because the test gives an indication of the porosity of the encapsulating resin and flaws such as cracks and any separation of the seal from the device chip.

Testing in accordance with this invention is not found to injure units under subsequent tests or use conditions.

The drying of the packaged component after pressurization may be performed by permitting it to sit in air or by employing an air stream to evaporate the liquid.

The test not only covers a wide leak spectrum but can be used to test devices in their protective carriers. It can also be used to measure the hermetic state of a product on a printed circuit board and serve to indicate the strength of packages to certain pressure levels.

While the invention has been shown and described in certain forms only, it is apparent that additional modifications may be made without departing of its scope.

We claim:

1. A method of testing hermeticity of an electrical component in a package comprising: placing said component in a chamber containing a liquid pressurized substantially above atmospheric pressure for a time to permit said liquid to penetrate within said package through a range of openings that may occur therein; removing said component from said liquid; drying the exterior of said package; and measuring the electrical resistance between two spaced conductors on the exterior of said package to determine the presence of liquid within the package.

2. The subject matter of claim 1 wherein: said liquid is at least one member of the group consisting of water and liquids having a viscosity and a surface tension about equal to or less than that of water, a conductivity about equal to or greater than that of pure water, and to which said packaged component is substantially nonreactive.

3. The subject matter of claim 2 wherein: said liquid is at least one member of the group consisting of water, methyl alcohol, ethyl alcohol, isopropyl alcohol, acetone, and liquid fluorohydrocarbons.

4. The subject matter of claim 3 wherein: said liquid fluorohydrocarbons are members of the group consisting of hexafluoro acetone sesquihydrate, trifluoro ethanol and hexafluoro-isopropanol.

5. The subject matter of claim 1 wherein: said liquid is pressurized to at least twice atmospheric pressure with said component therein for a time of at least five minutes.

6. The subject matter of claim 1 wherein: said liquid is methyl alcohol pressurized to at least 70 p.s.i.g. with said component therein for a time of at least four hours.

References Cited

UNITED STATES PATENTS

| 2,479,743 | 8/1949 | Hall et al. | 73—45.5 |
| 2,691,134 | 10/1954 | Ford | 73—40 XR |
| 2,766,442 | 10/1956 | Meyer | 340—242 |
| 2,846,872 | 8/1958 | McAdams et al. | 73—45.5 |
| 2,993,365 | 7/1961 | Van Allen | 73—49.3 XR |

LOUIS R. PRINCE, Primary Examiner

JEFFREY NOLTON, Assistant Examiner

U.S. Cl. X.R.

73—45.5; 324—65